United States Patent Office 2,864,830
Patented Dec. 16, 1958

2,864,830

11-OXYGENATED DERIVATIVES OF Δ⁴,⁶-19-NORANDROSTADIENE

Eugene J. Agnello and Gerald D. Laubach, Jackson Heights, N. Y., assignors to Chas. Pfizer & Co., Inc., New York, N. Y., a corporation of Delaware No Drawing. Application May 8, 1957
Serial No. 657,723

7 Claims. (Cl. 260—397.3)

This invention relates to new and useful anabolic agents and to compositions containing them. More particularly, it relates to certain 11-oxygenated derivatives of $\Delta^{4,6}$-19-norandrostene and to compositions of these compounds with pharmaceutical excipients.

The useful compounds of this invention are represented by the formula:

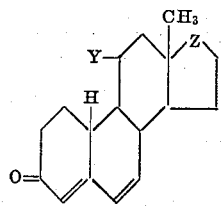

wherein Y is β-hydroxyl or keto, Z is

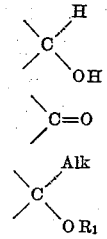

or

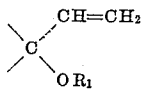

$R_1$ is hydrogen or acyl hydrocarbon containing up to ten carbon atoms; and Alk is an alkyl group containing up to four carbon atoms.

A suitable starting material for the preparation of the compounds of this invention is the well known compound $\Delta^4$-norandrostene-3,17-dione. This compound is readily prepared from 3-methoxy estrone by reduction of the estrone with sodium in liquid ammonia followed by acid hydrolysis and chromic acid oxidation of the 17-hydroxyl group.

Various modifications at the $C_{17}$ position can be made by procedures well known in the art. For conversion of the 17-keto group to a 17-hydroxy group the 3-keto group is preferentially converted to a pyrrolidinyl derivative, the 17-keto group is then reduced with lithium aluminum hydride and the pyrrolidinyl group removed by refluxing in a sodium acetate-acetic acid buffered aqueous-methanol solution. This reaction is described in detail by Heyl and Herr in the Journal of The American Chemical Society, 75, 1918 (1953). The vinyl group can be introduced at the $C_{17}$ position by treating the 17-ketone with acetylene in the presence of a potassium tert-alkoxide (for example, potassium tert-amyl oxide) and reducing the thus produced ethynyl group by catalytic hydrogenation. For the introduction of the vinyl group the 3-keto group should again be protected by a pyrrolidinyl group which is, of course, subsequently removed. The 17-keto group can be converted to a tertiary alcohol, that is, an alkyl and hydroxyl group can be introduced at the 17-position by treatment with an organo-metallic compound of the type RLi or RMgX wherein R is alkyl up to four and X is a halogen. For the introduction of the vinyl group or the reaction with an organo-metallic compound the 3-keto group should be protected by a pyrrolidinyl group as described above. A 17-hydroxyl group can be readily esterified with the usual esterifying agents if it is the hydroxyl group of a secondary alcohol. If it is the hydroxyl of a tertiary alcohol it can be esterified by refluxing in a liquid anhydride, for example, acetic or propionic anhydride or in the case of a solid anhydride by heating the compound at about 100° C. in a hydrocarbon solvent such as xylene containing the anhydride and catalytic amounts of potassium acetate. Esters and acid esters of the 17-hydroxyl group can be obtained in this manner. If an 11-hydroxyl group is to be converted to a keto group by oxidation, for example, with chromic acid, and there is an hydroxyl group at the 17-position it is best to acylate this group before oxidizing the group at the 11-position. As stated above, all of these reactions are conventional in the art.

The compounds of the instant invention are prepared from the above described starting materials by the action of a quinone as described in earlier filed patent applications, Serial No. 526,554, filed August 4, 1955, and Serial No. 633,538, filed January 10, 1957.

In these earlier filed patent applications a method is described for the introduction of double bonds into the 6(7)-position by dehydrogenation of a 3-keto-6-dihydro-$\Delta^4$-steroid compound with a quinone having an oxidation-reduction potential less than $-0.5$ at a temperature of between 70° C. and 190° C. in an inert organic solvent having a boiling point of at least about 70° C. These solvents include mono-nuclear aromatic hydrocarbons, mono-nuclear halogenated aromatic hydrocarbon solvents, oxygenated polar alicyclic organic solvents and oxygenated polar aliphatic organic solvents. Typical solvents include tertiary butanol, n-amyl alcohol, hexanol, isoamyl alcohol, heptanol-3, cyclohexanol, ortho-dichlorobenzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate, and amyl propionate. The preparation of the valuable compounds of the instant invention using the process described in the earlier filed applications is more fully illustrated in the appended examples.

Although the reactions with a quinone described above are applicable to compounds in which the 17-position carries a free β-hydroxyl group, for optimum results it is best that this hydroxyl group be acylated with an acyl hydrocarbon group containing up to ten carbon atoms. The term, "acyl hydrocarbon" includes acyl hydrocarbon groups containing only carbon, hydrogen and oxygen derived from monocarboxylic or dicarboxylic acids. In the event that the acyl hydrocarbon group is one derived from a dicarboxylic acid, it is often advantageous to treat the isolated anabolically active compounds with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

The products of this invention, as stated above, are valuable medicinally as anabolic agents, that is, they aid at rebuilding human tissue injured by surgery or depleted by serious illness. When used in the treatment of these conditions the compounds of this invention are administered in dosages of approximately the same order of magnitude as other agents often recommended for these purposes such as 17α-ethyl-17-hydroxy-norandrosterone, 11β,17β-dihydroxy-9α-fluoro-17α-methyl-4-androstene-3-one or 11β,17β-dihydroxy-17α-methyl-4-androstene-3-one. Because of their high order of activity, it is sometimes possible to use dosages of the compounds of this invention which are lower than compounds presently utilized. They accomplish their valuable therapeutic effect with a minimum of undesirable androgenic activity. For this reason, and because they are effective at relatively low levels, they can be administered for extended periods of time to patients of either sex.

The biologically active compounds of this invention may be administered alone or in combination with acceptable pharmaceutical carriers, the choice of which is determined by the preferred route of administration, the solubility of the compound and standard pharmaceutical practice. For oral administration the compounds may be administered in the form of tablets containing excipients such as starch or milk sugar. Aqueous solutions and elixirs which may be sweetened or flavored may also be used. For intra-articular injection aqueous suspensions may be employed. In this case various suspending and wetting agents may be added to the composition to obtain a suspension not tending to settle out easily or to pack down in the bottle in which it is stored. Intramuscular and subcutaneous dosage forms may also be prepared by standard pharmaceutical practice.

The following examples are given solely for the purpose of illustration and are not to be construed as limitations of this invention, many apparent variations of which are possible without departing from the spirit or scope thereof.

This application is a continuation-in-part of earlier filed patent applications, Serial No. 526,554, filed August 4, 1955, and Serial No. 633,538, filed January 10, 1957.

EXAMPLE I $\Delta^{4,6}$-norandrostadiene-17β-ol-3,11-dione 17-acetate

A mixture of 0.8 g. of $\Delta^4$-norandrostene-17β-ol-3,11-dione 17-acetate (prepared by acylation of the product obtained from the application of the method of Heyl and Herr to $\Delta^4$-norandrostene-11β-ol-3,17-dione) and 0.9 g. of p-benzoquinone in 70 ml. of n-amyl alcohol was refluxed in a nitrogen atmosphere for ten hours. The solvent was removed in vacuo and the residue taken up in 150 ml. of chloroform. The chloroform solution was washed with several small portions of 5% sodium hydroxide solution and then with water. It was dried over anhydrous sodium sulfate, filtered and concentrated in vacuo. The residue was triturated in ether and dried to obtain the desired product.

The process was repeated on the non-acylated compound to prepare $\Delta^{4,6}$-norandrostadiene-17β-ol-3,11-dione.

EXAMPLE II $\Delta^{4,6}$-norandrostadiene-3,11,17-trione

A mixture containing 0.4 g. of $\Delta^4$-norandrostene-3,11,17-trione and 1.1 g. of 2,6-dichloro-1,4-benzoquinone in 35 ml. of n-amyl alcohol was refluxed under nitrogen for three hours. It was concentrated to 5 ml. on a hot plate and the residue taken up in 30 ml. of chloroform. It was washed twice with 25 ml. portions of water, four times with 25 ml. portions of 5% aqueous sodium hydroxide and four additional times with 25 ml. portions of water. The organic layer was dried over anhydrous sodium sulfate, filtered and concentrated to dryness in vacuo. The residue was triturated with 1:1 ether-ethyl acetate to give the desired product.

EXAMPLE III $\Delta^{4,6}$-norandrostadiene-11β,17β-diol-17α-methyl-3-one 17-decanoate A mixture of 0.8 g. of $\Delta^4$-norandrostene-11β,17β-diol-17α-methyl-3-one 17-decanoate and 0.9 g. of chloranil in 70 ml. of tert-butanol was refluxed in a nitrogen atmosphere for two hours. The solvent was removed in vacuo and the residue taken up in 150 ml. of chloroform. The chloroform solution was washed with several small portions of 5% sodium hydroxide solution and then with water. It was dried over anhydrous sodium sulfate, filtered and the filtrate concentrated in vacuo. The residue was triturated in ether and dried to obtain the desired product.

EXAMPLE IV $\Delta^{4,6}$-norandrostadiene-17β-ol-17α-n-butyl-3,11-dione 17-acetate The procedure of Example III was repeated using $\Delta^4$-norandrostene-17β-ol-17α-n-butyl-3,11-dione 17-acetate as the starting material and the desired product was recovered.

EXAMPLE V $\Delta^{4,6}$-norandrostadiene-11β,17β-diol-17α-vinyl-3-one 17-valerate A mixture of 0.4 g. of $\Delta^4$-norandrostene-11β,17β-diol-17α-vinyl-3-one 17-valerate and 0.5 g. of chloranil in 35 ml. of t-amyl alcohol was refluxed under nitrogen with stirring for three hours. It was concentrated to 5 ml. on a hot plate and the solution taken up in 30 ml. of chloroform. It was washed twice with 25 ml. portions of water, four times with 25 ml. portions of 5% aqueous sodium hydroxide and four additional times with 25 ml. portions of water. The mixture was dried over anhydrous sodium sulfate, filtered and concentrated to dryness in vacuo. The residue was triturated with 1:1 ether-ethyl acetate to obtain the desired product.

EXAMPLE VI

The free 17-alcohols of the 17-esters prepared as in the previous examples were each prepared by hydrolysis of the ester by addition of one molar portion of potassium carbonate in 10% aqueous-methanol solution of the ester. The mixture was allowed to stand at room temperature for one hour and then poured into iced water to precipitate the free alcohols.

EXAMPLE VII

A variety of esters of the 17-alcohols synthesized in the previous examples were prepared by treating each of the free alcohols with acylating agents by conventional methods. These included such compounds as the formate, the propionate, the isobutyrate, the hexanoate, the benzoate, the octanoate, the stearate, the hemisuccinate, the trimethyl acetate, the cyclohexane carbamate, the cyclopentyl propionate, etc. The acid esters of polycarboxylic esters such as the hemisuccinate have the advantage that the alkali metal or alkaline earth metal salts can be prepared from them by treating with molar proportions of a base such as sodium bicarbonate or calcium hydroxide. These salts in addition to being biologically active have the advantage of being more soluble in water than the free alcohols themselves or the ordinary esters thereof.

What is claimed is:

1. A compound selected from the group consisting of those having the formula:

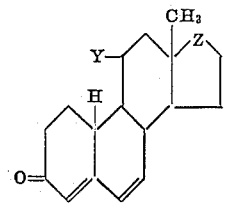

wherein Y is selected from the group consisting of β-hydroxyl and keto, Z is selected from the group consisting of

and

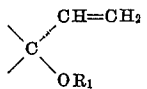

$R_1$ is selected from the group consisting of hydrogen and acyl hydrocarbon containing up to ten carbon atoms; and Alk is selected from the group consisting of alkyl groups containing up to four carbon atoms.

2. A pharmaceutical composition comprising a compound as claimed in claim 1 together with a pharmaceutically acceptable carrier.

3. $\Delta^{4,6}$-norandrostadiene-17$\beta$-ol-3,11-dione 17-acetate.

4. $\Delta^{4,6}$-norandrostadiene-3,11,17-trione.

5. $\Delta^{4,6}$ - norandrostadiene - 11$\beta$,17$\beta$ - diol - 17$\alpha$ - methyl-3-one 17-decanoate.

6. $\Delta^{4,6}$ - norandrostadiene - 17$\beta$ - ol - 17$\alpha$ - n - butyl-3,11-dione 17-acetate.

7. $\Delta^{4,6}$-norandrostadiene - 11$\beta$,17$\beta$ - diol - 17$\alpha$ - vinyl-3-one 17-valerate.

References Cited in the file of this patent

UNITED STATES PATENTS

| | | |
|---|---|---|
| 2,695,260 | Murray | Nov. 23, 1954 |
| 2,739,974 | Colton | Mar. 27, 1956 |